Oct. 27, 1959 P. ALEKSA 2,910,538

DESK TELEPHONE

Filed June 10, 1957

INVENTOR.
Peter Aleksa.
BY C. R. Sipe
Atty.

United States Patent Office 2,910,538

Patented Oct. 27, 1959

2,910,538

DESK TELEPHONE

Peter Aleksa, Chicago, Ill., assignor to General Telephone Laboratories, Incorporated, Chicago, Ill., a corporation of Delaware Application June 10, 1957, Serial No. 664,590

11 Claims. (Cl. 179—103)

My invention relates in general to a desk telephone and more specifically to a telephone of the upright type having a base including the usual impulse sender and an upright portion extending upward from the base and supporting the usual receiver. The transmitter is also included in the base and the whole comprises a unitary structure forming a hand telephone lifted as a unit.

Certain telephones of this type have been designed in which the transmitter and receiver were on the front side of the telephone and the calling device was located on the bottom of the base so that the telephone had to be turned upside down to operate the dial.

My improved design comprises a telephone of this type in which both the calling device and the transmitter are located on the upper front surface of the telephone base, with the transmitter located in the center of the finger hole dial. This improved design also includes novel means for mounting the transmitter, impulse sender, switch-hook operating mechanism, and the usual other components of the telephone in the base, so that the telephone may be lifted and operated as a unit, without turning the telephone upside down.

Certain features of novelty will be apparent from the following detailed description, having reference to the accompanying drawings.

Figures 1, 2, 3, 4, 5:
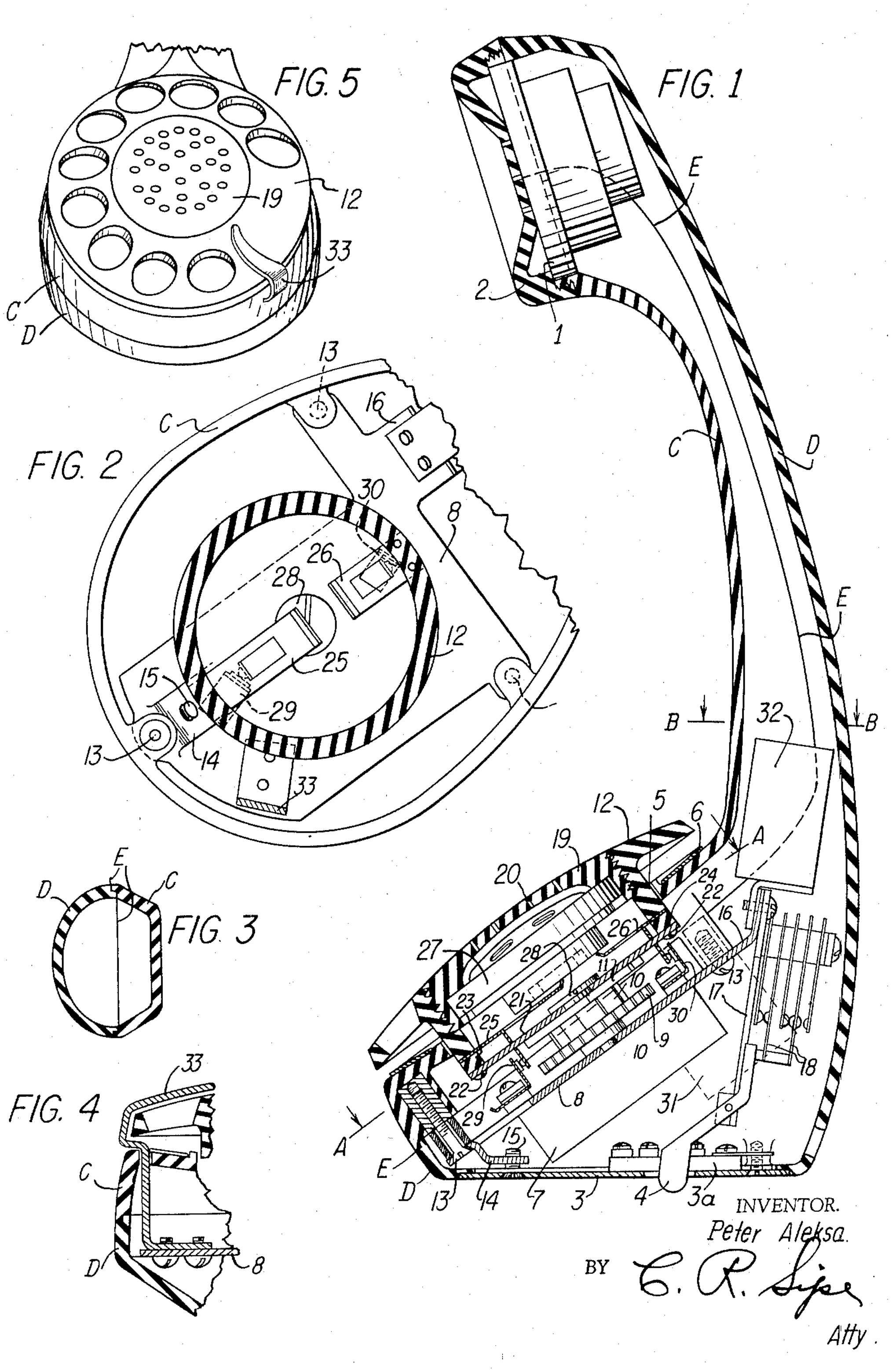
Fig. 1 is a side view, in section, of my improved desk telephone.
Fig. 2 is a sectional view taken in the direction of the arrows along line A—A of Fig. 1.
Fig. 3 is a sectional view taken along line B—B of Fig. 1 showing the construction of the casing.
Fig. 4 is a partial sectional view of one segment of the base showing the mounting of the finger stop of the calling device.
Fig. 5 is a front view of the lower portion of the telephone showing the relative position of the dial to the telephone.

Referring now to Fig. 1 it will be seen that the telephone housing is formed of two parts, a front section C and a rear section D. The two sections are joined together along a line E. The front and back sections together form an opening at the upper end thereof which contains the usual receiver 1, which is held in place by a receiver cap 2 against the usual contact springs (not shown) to complete the telephone circuit, and which cap also holds the upper ends of sections C and D together by engaging the threads of both sections.

The lower part of the rear section D is formed as a base with a flat surface on its lower side upon which the instrument rests on a table or desk. A plate 3 covers an opening in the base and also has an opening therein through which the switch-hook operating element 4 projects.

The front section C has an opening 5 formed therein to accommodate the calling device and has a designation strip 6 in circular form surrounding the opening and carrying the usual letters and figures in alignment with the holes of the finger hole dial of the calling device.

The calling device used is practically the same as that shown in United States Patent No. 1,642,822 granted September 20, 1927, to H. F. Obergfell. The usual impulse springs, off-normal springs, governor etc., are all shown in block form at 7 and are mounted on the modified plate 8 which replaces the usual cup shaped plate of the device shown in said patent. In front of the plate 8 is the usual gear wheel 9 which operates the usual pinion gear of the governor and the ratchet wheel 10 which cooperates with the usual pawl on plate 11 to insure that the impulse sending mechanism and governor are operated only upon the return or counterclockwise movement of the finger hole dial 12.

The plate 8, which, as stated, is a modified form of the base plate of the standard calling device, is secured to the front section C by means of screws such as shown at 13. It has a turned back lug or bracket 14 to which the base plate 3 is secured by screws 15. Plate 8 also has an extended bracket 16 to which is secured a mounting bracket 17, supporting the usual switch-hook springs 18, and to which is pivoted the operating element 4 which extends through an opening in plate 3 and is operated when the set is place on a table or desk.

The plate 3 supports a terminal strip 3*a* containing the usual telephone terminals to which the ends of the cord or incoming wires are secured. The plate 3 as shown rests against a shoulder in the circular opening in the base surface of section D and therefore when screws such as 15 are tightened, the lower part of section D is rigidly secured to section C.

The finger hole dial of the calling device has also been modified and comprises a sub-assembly consisting of the finger dial 12, preferably of plastic or the like, having a threaded opening in the center thereof in which a transmitter unit 27 is placed, and having an externally threaded insert 19 with perforations in the center thereof at 20. The dial 12 is secured to a plate 21 by means of screws 22, and bushings 23 and 24 clamp in place a pair of contact springs 25 and 26 which have arms contacting the center and outer rear contact surfaces of the transmitter unit 27 which is pressed against these contact springs by screwing the center section 19 of the finger dial into the threaded opening. The upper surface of section 19 forms a flush curved upper surface with the surface of the finger dial. Before the transmitter is inserted in the center of the dial, a screw 28 is used to clamp the plate 21 rigidly to the dial shaft and to plate 11 so that motion of the finger dial is communicated to the impulse sending mechanism.

Mounted on plate 8 are a pair of contact springs 29 and 30 which engage downwardly extending parts of springs 25 and 26 to complete the circuit to the transmitter 27. The contact between these springs is opened whenever the dial is turned off-normal and closed when it returns to normal. If desired, the circuit of the transmitter may be kept continuously closed by a ring contact and wiper arrangement instead of these off-normal springs. Also included in the base and secured in any desired manner to plate 8 are the usual induction coil 31 and condenser 32 which are included in the telephone circuit.

As shown in Figs. 4 and 5, the finger stop 33 for the dial may be inserted through an opening in section C and secured to plate 8 in any desired manner.

It will thus be seen that I have provided a new and novel unitary desk telephone with the dial on the upper side of the base for ease in operation thereof and also have provided a simple, novel and efficient manner of mounting the switch-hook springs, the transmitter and the calling device.

Having described one embodiment of my invention, it will be seen that changes may be made in many of the details described without departing from the spirit of my invention, and what I consider to be novel and desired to have protected by Letters Patent is set forth in the appended claims.

What I claim is:

1. A telephone instrument of the pedetal type including a casing formed in two sections separable from each other and secured together to provide a unitary structure including a base, enclosing a transmitter and impulse sending mechanism, and an erect portion enclosing a receiver, said sections dividing the instrument into front and rear portions secured together along a line substantially vertical and running longitudinally with said erect portion, the upper portions of the front and rear sections each having a threaded semi-circular rim forming a casing for the receiver, a cap threaded over the threads of both sections to secure a receiver in place and secure the upper end of the front and rear sections together, a plate secured to the inner side of the front section at the base thereof, a combined impulse sending mechanism and transmitter secured to said plate, the combined impulse sending mechanism and transmitter extending through an opening in the upper front side of said base, and a second plate forming a part of the base of said instrument and secured to said first plate to secure the lower ends of said front and rear sections together.

2. A telephone instrument such as claimed in claim 1, including a set of switch-hook springs secured to said first plate, and an operating element therefor extending through an opening in said second plate.

3. A telephone instrument of the pedestal type having a base supporting an upright portion and having a receiver included in the upper end of the upright portion and impulse sending mechanism included in the base thereof, a finger hole dial secured to said mechanism and extending through an opening in the upper front surface of said base, a transmitter mounted in a cavity in the center of said finger dial, and a threaded insert in the center of said dial covering said cavity and holding the transmitter in place in said cavity.

4. A pedestal type telephone comprising a casing having a base portion and a pedestal portion extending upward from the base and supporting a receiver, a plate secured to the inner surface of said casing and supporting an impulse sending mechanism, a finger hole dial assembly secured to the mechanism for operating the same, said assembly including a cup-shaped finger dial with a transmitter mounted in the center thereof and held in place by a threaded and perforated disc in the center of the dial, and off-normal springs connected to the transmitter and operated, whenever the dial is rotated off-normal, to open the circuit of the transmitter.

5. A pedestal type telephone having a hollow base with an upright portion supporting a receiver, a plate secured to the inner upper surface of said base and supporting impulse sending mechanism on the front side thereof, switch-hook springs and a switch-hook lever mounted on the back side thereof of said plate, the usual gears and ratchet arrangement of the mechanism extending from the front upper side of the plate under an opening in the upper front side of the base, a finger hole dial assembly including the finger dial, a transmitter, and circuit closing springs for the transmitter, said assembly secured to the top of said gear and ratchet arrangement and extending through said opening in the upper side of the base, said switch-hook operating lever extending through an opening in the lower side of the base and operated when the telephone is placed upon a table or desk.

6. A pedestal type telephone having a casing formed of front and rear sections joined together along a line running longitudinally of the telephone, the front section having an opening in the front side thereof in which a combined calling device and transmitter unit is mounted, and the rear section having a portion thereof forming a base, the front and rear sections each having a cavity in its upper end with a semi-circular threaded rim around it for supporting a receiver, and a receiver cap engaging the threaded rims of both sections to hold the receiver in the cavities and to secure said sections together.

7. A hand telephone comprising a handle with a receiver mounted at one end thereof, a combination unit mounted at the other end of the handle including an impulse sender having a finger hole dial, said finger dial having a cavity therein, a transmitter mounted in said cavity, and a plate covering said cavity and transmitter, said plate comprising a threaded insert, threaded into a threaded opening in the finger dial, and forming an upper surface flush with the upper surface of the finger dial.

8. A hand telephone such as claimed in claim 7 in which the upper surface of said plate and the upper surface of said finger dial form a flush convex surface.

9. In a telephone calling device having impulse sending mechanism and a shaft for operating the same, a transparent finger hole dial having a curved upper surface with a row of finger holes around the outer side thereof and a threaded opening in the center, means located within said opening for securing said dial to said shaft, and a transparent insert externally threaded and fitting into said opening over said securing means and its upper surface forming a curved surface flush with the upper curved surface of said dial.

10. A telephone calling device having impulse sending mechanism and a shaft for operating the mechanism, a finger hole dial having a row of finger holes around the periphery thereof and having a threaded opening in the center thereof, said dial secured to said shaft, a pair of contact springs mounted in said opening, a voice transmitter mounted in said opening and having contact surfaces, a threaded insert threaded into said threaded opening and holding the contact surfaces of the transmitter against said contact springs, said insert forming a smooth curved surface flush with the upper surface of said dial.

11. A pedestal type hand telephone comprising an upright portion carrying a forwardly facing receiver in the upper end thereof and a base portion on the lower end of said upright portion and normally supporting the upright portion in an erect position, a combined impulse transmitter and voice transmitter unit mounted in said base portion, said unit including the usual impulse transmitting mechanism and a transparent finger hole dial secured thereto and having a cavity in the center thereof, the voice transmitter mounted wholly within said cavity of said dial and having a threaded insert in the center of the dial securing the transmitter in place, said unit so mounted in the base that the portion of the dial enclosing said voice transmitter protrudes from the upper surface of the base portion.

References Cited in the file of this patent

UNITED STATES PATENTS

| | | |
|---|---|---|
| 2,183,744 | Hubbell | Dec. 19, 1939 |
| 2,191,933 | McLorn | Feb. 27, 1940 |